United States Patent [19]
Mann

[11] 3,859,454
[45] Jan. 7, 1975

[54] COVER PLATE

[75] Inventor: Milton Mann, Los Angeles, Calif.

[73] Assignee: Production Products, Inc., Sylmar, Calif.

[22] Filed: Sept. 13, 1973

[21] Appl. No.: 396,840

[52] U.S. Cl. .................. 174/66, 220/24.2
[51] Int. Cl. ............................. H02g 3/14
[58] Field of Search ............ 174/66, 67, 65 R; 220/24.2, 24.3

[56] References Cited
UNITED STATES PATENTS

| 998,119 | 7/1911 | Peterson | 174/66 |
|---|---|---|---|
| 2,787,398 | 4/1957 | Smith | 220/24.2 |
| 3,177,285 | 4/1965 | Hoskins | 174/48 |
| 3,729,572 | 4/1973 | Helin | 174/66 |
| 3,773,969 | 11/1973 | Geisel | 174/67 |

FOREIGN PATENTS OR APPLICATIONS

| 326,717 | 2/1958 | Switzerland | 174/66 |

Primary Examiner—J. V. Truhe
Assistant Examiner—David A. Tone
Attorney, Agent, or Firm—Robert Louis Finkel

[57] ABSTRACT

A rigid two-piece plastic cover plate for wired receptacles or the like. Rearwardly projecting ears with serrated outer faces are formed on the back of the body of the plate to engage the edges of the receptacle and hold the plate assembly releasably in place. A slidably removeable section of the plate is provided with arcuately shaped knock-out regions at one of its edges corresponding to similar regions in an adjacent area of the plate body. Openings of several pre-selected sizes may be formed by breaking away corresponding regions of the slide and plate body. Withdrawing the removeable section from the plate body allows the plate to be mounted or dismounted without disconnecting the wiring from the receptacle.

7 Claims, 6 Drawing Figures

PATENTED JAN 7 1975　　3,859,454

COVER PLATE

BACKGROUND AND SUMMARY OF THE INVENTION

This invention relates to cover plates for electrical receptacles, and more particularly to removeable cover plates for receptacles to which electrical appliances such as telephones are more or less permanently wired.

In a variety of situations it may become necessary to remove the protective cover plate from an electrical outlet, such as a household telephone junction box or wall receptacle. A broken plate may have to be replaced; the wiring may require inspection; the receptacle or its contents may need work.

Prior art cover plates generally have a single centrally located port of fixed size through which the wire or cable to the appliance is threaded. Commonly these plates are mounted to the receptacle by screws. Some are provided with quick-release attachment means by which they may relatively easily be dismounted from the outlet. In either case, however, the plate must be slipped along the appliance cord in order to gain access into the box. This is both time consumming and awkward, and on occasion results in damage to the cord's insulation or to the plate, which is left exposed and dangling from the cord.

If the appliance is to be disconnected or the plate replaced, the cord must be released from the terminals and the plate slipped off its free end, another time-consuming task. When the cord is a large, multi-wire cable terminating in a connector, as is more and more often the case, the task becomes a tedious project.

Replacing the appliance or plate then necessitates threading the end of the cord through the port again, reconnecting it to the fixed terminals, or where a connector is involved, rewiring either the connector or the appliance, slipping the plate over the receptacle, and securing it in place. If the wire or cable of the new appliance is larger or smaller in diameter than the one it replaces, the port in the original cover plate will be too small or too large and a new plate will have to be used. In the area of telephone installations alone, since phone wires and cables commonly come in at least four different sizes, this creates an inventory requirement of enormous proportions.

The subject invention has for its object the provision of an inexpensively manufactured, lightweight, decorative, easily attachable cover plate of the type described, which is readily adapted for use with wires and cables of a variety of sizes.

Essentially the invention contemplates a rigid two-piece generally flat plate. One section of the plate may be described as the body and carries means, such as rearwardly projecting resilient ears, for releasably attaching the plate over the receptacle opening. The second section is connected to the body by releasable attachment means. In the preferred embodiment this section takes the form of an elongated element having tongues formed along its sides adapted to fit slidingly into a pair of grooves formed in the adjacent sides of a similarly shaped cutout in the body.

A plurality of arcuately shaped knock-outs are formed at one end of the removable section to correspond with similar regions in an adjacent area of the body. Openings for wires or cables of various preselected sizes may be created by removing the appropriate knock-outs from the body and slide section.

By virtue of this construction the plate may be dismounted from the receptacle and released from the wire or cable with ease.

For a fuller appreciation of the invention and its advantages, reference is made to the following detailed description of one of its preferred embodiments as illustrated in the accompanying drawings in which:

In the drawings

Wherever practicable the same numeral is used in the several figures to represent the same or functionally similar elements.

DETAILED DESCRIPTION

Figure 1:
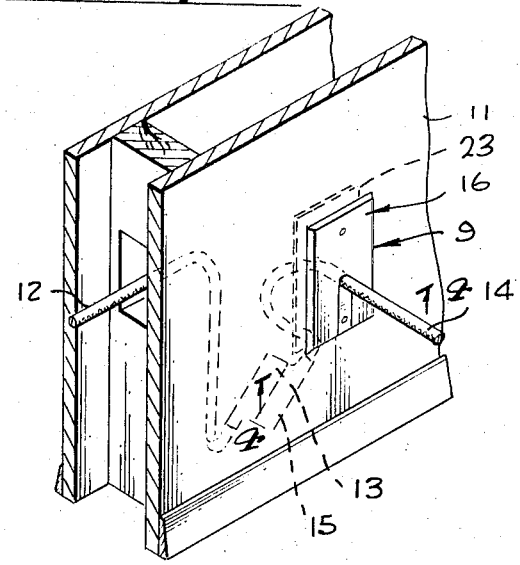
FIG. 1 is a fragmentary perspective view of a typical wall-mounted telephone outlet, showing a cover plate in accordance with the subject invention in place.

Referring to FIG. 1, typically in residential and commerical buildings telephone outlets 9 are installed at convenient locations in walls 11 at the time of construction.

Wiring 12 is run from an exterior service point or junction panel (not shown) to a connector 13 at the outlet. The wire or cable 14 of the subscriber's telephone appliance (not shown) is tied to the service through its mating connector 15. Cover plate 16 is mounted over the wire 14 and secured over the outlet opening to enclose the installation and give it an attractive appearance.

Figure 2:
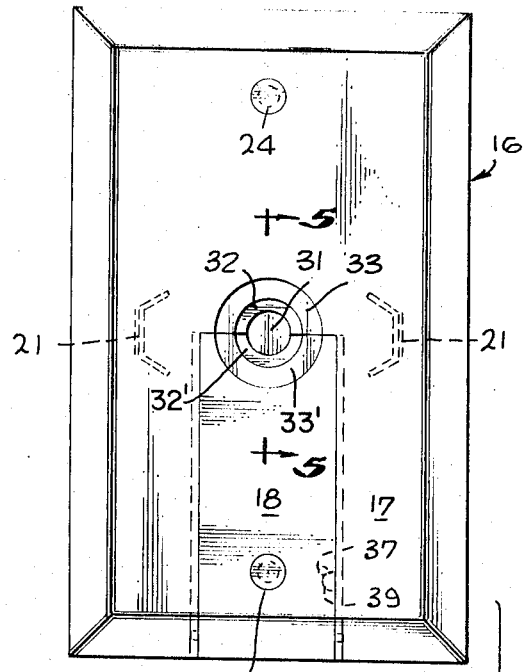
FIG. 2 is an enlarged front elevation of the cover plate of FIG. 1 showing in phantom the removeable section as it would appear when completely withdrawn.
Figure 3:
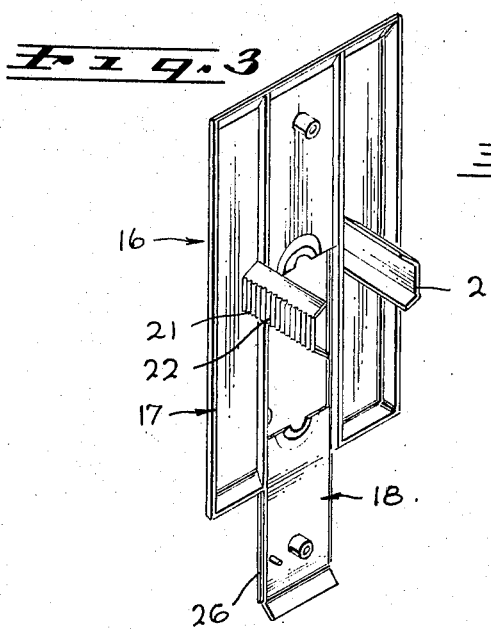
FIG. 3 is a rear perspective view of a cover plate such as that of FIG. 1 with the removeable section partially withdrawn.
Figure 5:
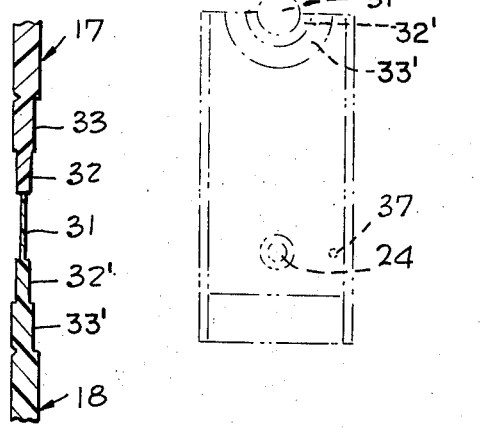
FIG. 5 is an enlarged fragmentary section taken in the direction of 5—5 of FIG. 2.
Figure 4:
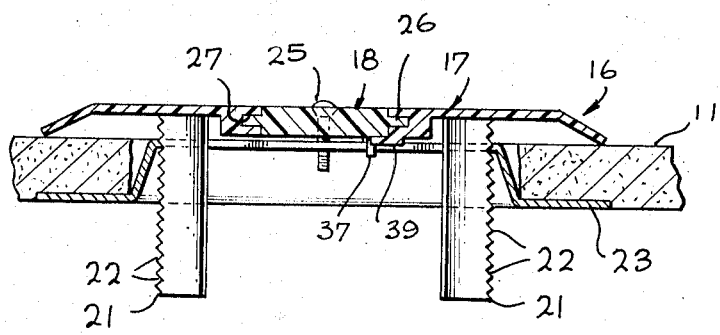
FIG. 4 is an enlarged fragmentary section taken in the direction 4—4 of FIG. 1.

Referring to FIGS. 2 – 4, the cover plate 16 itself is made in two sections 17, 18. For most installations the plate 16 is rectangular in shape. It may be formed of any suitable material and with any desired thickness. In practice thin, rigid plates molded of thermosetting plastics have proved to be quite satisfactory.

Body section 17 is formed with a pair of rearwardly extending ears 21 on its rear face. These likewise may be of any convenient shape. Preferably they are thin enough to have some resilience and spaced to fit snugly into the open mouth of the outlet. Serrations 22 may be molded in the outer faces of ears 21 to grasp the edges of the outlet mouth. A preformed metal or plastic "picture frame," mounting bracket 23 may be secured in the opening to provide a standardized receiver for the serrated ears 21. Naturally if the outlet includes a metal receptacle box, bracket 23 may not be required.

If desired a pair of holes 24 may be provided in sections 17 and 18 whereby plate 16 may be secured more firmly to bracket 23 or the receptacle box, if there is one, by means of conventional screws 25.

Adjacent edges of sections 17 and 18 are formed with cooperating tongues 26 and grooves 27 which permit section 18 to be withdrawn slidably from body section 17.

The interior end of section 18 and the adjacent region of body 17 are provided with a plurality of arcuate knock-outs which may be formed by conventional molding techniques.

In the embodiment illustrated a circular knockout 31 is formed on and extended beyond the end of section 18. Preferably the center of knockout 31 lies in the parting line between section 18 and the adjacent region of body 17. Arcuate knockouts 32, 33 and 32', 33' are provided in body 17 and section 18, respectively.

It will be apparent that by removing circular element 31 while leaving elements 32, 32' in place as illustrated in FIG. 3, plate 16 can be adapted to receive a cord of relatively small diameter, such as the typical three lead or six lead wire used for single phone sets. With segments 32, 32' removed, plate 16 will accept the larger 50 lead cable. And with segments 33 and 33' removed, still heavier 100 lead cable can be accommodated.

While not ordinarily necessary, it has been found highly desirable in some applications to provide sections 17 and 18 with releasable detent means to prevent section 18 from inadvertently being displaced or separated from section 17. In the preferred embodiment shown, a resilient pin 37 formed on the rear face of section 18 to engage a boss 39 formed on the adjacent grooved edge of the receiver when section 18 is in place serves this purpose.

Obviously the invention is not limited to the number, size or specific arrangement of removeable elements shown and described here. By the same token, the slideable section 18 may take a variety of forms other than that shown.

Figure 6:
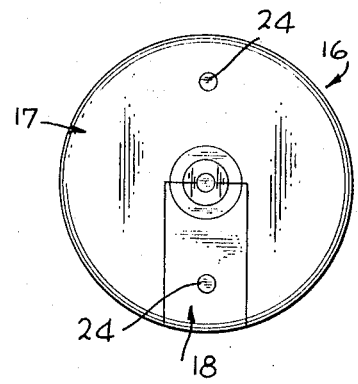
FIG. 6 is a front elevation of a cover plate in an alternative shape.

Likewise, as mentioned earlier, the invention is not restricted to the rectangular shape illustrated in FIGS. 1 – 4. By way of example, FIG. 6 shows a cover plate in accordance with the invention having a circular configuration.

With the foregoing description and understanding in mind, what is claimed is:

1. A removeable cover plate for a cord outlet opening comprising:
   a first body section adapted to cover a portion of said outlet opening and formed with an inlet at one of its edges, said inlet having a pair of parallel sides extending inwardly of said edge;
   mounting means formed on the rear of said first section adapted to cooperate with the sides of said opening to releasably mount said first section over said opening;
   a second slide section formed with a pair of parallel sides spaced to conform with the parallel sides of said inlet, said second section having a common parting line with said first section;
   cooperating tongues and grooves formed on adjacent parallel sides of said first and second sections, said second section being slidingly inserted into said inlet to cover the remainder of said opening; and
   a circular knockout and a plurality of annular knockouts concentric therewith formed in said first and second sections adjacent said common parting line and selectively removeable from said sections to provide a port through said cover plate of variable predetermined size for cords of varied diameters when said sections are attached.

2. A removeable cover plate according to claim 1, wherein:
   said circular knockout is formed in one of said sections with its center on said common parting line; and
   the other of said sections is formed with a recess at said parting line adapted to conform with and receive the portion of said circular knockout extending outwardly of the section in which it is formed.

3. A removeable cover plate according to claim 2, wherein:
   a plurality of concentric semi-circular annular knockouts are formed around said circular knockout in the one of said sections in which said circular knockout is formed; and
   a plurality of concentric semi-circular annular knockouts are formed in the other of said sections around the recess therein.

4. A removeable cover plate according to claim 3, wherein said mounting means includes a pair of resilient ears extending rearward of said body section and spaced to engage snugly the sides of said outlet opening.

5. A removeable cover plate according to claim 4, wherein said ears are provided with serrations on their outwardly disposed faces for gripping the sides of said outlet opening.

6. A removeable cover plate according to claim 5, wherein said first and second sections are provided with detent means cooperating to retain said sections in attachment.

7. A removeable cover plate according to claim 6, wherein said detent means comprise a boss formed at one of the parallel sides of said inlet to overlap and extend inwardly of said second section, and a resilient pin formed on said second section and adapted to engage said boss when said second section is inserted into said inlet.

* * * * *